(12) United States Patent
Goldberg

(10) Patent No.: US 7,779,452 B2
(45) Date of Patent: Aug. 17, 2010

(54) COMPUTER ACCESS SECURITY

(75) Inventor: Itzhack Goldberg, Hadera (IL)

(73) Assignee: International Business Machines Corporation, Armonk, NY (US)

( * ) Notice: Subject to any disclaimer, the term of this patent is extended or adjusted under 35 U.S.C. 154(b) by 1119 days.

(21) Appl. No.: 11/099,086

(22) Filed: Apr. 5, 2005

(65) Prior Publication Data

US 2006/0236118 A1 Oct. 19, 2006

(51) Int. Cl.
*H04L 9/32* (2006.01)
*H04L 9/00* (2006.01)

(52) U.S. Cl. .............................. 726/4; 726/17; 713/185; 713/168

(58) Field of Classification Search ...................... 726/4, 726/1, 3; 713/185, 161, 168, 152, 165
See application file for complete search history.

(56) References Cited

U.S. PATENT DOCUMENTS

| | | | |
|---|---|---|---|
| 5,544,246 A * | 8/1996 | Mandelbaum et al. | ........ 705/65 |
| 5,774,650 A * | 6/1998 | Chapman et al. | ................ 726/7 |
| 6,311,275 B1 | 10/2001 | Jin et al. | |
| 6,324,538 B1 | 11/2001 | Wesinger, Jr. et al. | |
| 6,643,782 B1 | 11/2003 | Jin et al. | |
| 6,718,467 B1 | 4/2004 | Trostle | |
| 2003/0056096 A1 | 3/2003 | Albert et al. | |
| 2003/0093680 A1 * | 5/2003 | Astley et al. | ................ 713/183 |
| 2006/0137000 A1 * | 6/2006 | Isaacson | ........................ 726/7 |

FOREIGN PATENT DOCUMENTS

WO    WO 02/086718    10/2002

OTHER PUBLICATIONS

Hal Pomeranz, One-Time Passwords, 2000, Hal Pomeranz and Deer Run Associates, pp. 5 and 17-24.*
Hal Pomeranz, One-Time Passwords, 2000, Deer Run Associates, pp. 4-8 and 17.*

* cited by examiner

*Primary Examiner*—Jung Kim
*Assistant Examiner*—Izunna Okeke

(57) ABSTRACT

A method is provided for improved computer access security, the method including protecting an access record to prevent password access to a computer via the access record, creating an alternate access record corresponding to the protected record, enabling password access to the computer via the alternate record, providing the alternate record with the access level of the protected record, and configuring the alternate record to indicate a supplemental security program to be executed once a correct password for the alternate record is provided.

11 Claims, 3 Drawing Sheets

COMPUTER ACCESS SECURITY

FIELD OF THE INVENTION

The present invention relates to computer access security in general, and more particularly to password-based and public/private key-based access protocols.

BACKGROUND OF THE INVENTION

Various computer security protocols have been developed to ensure that only authorized users gain access to a computer. In one basic configuration, a password may be used to gain access. Unfortunately, where the user accesses a computer A from a remote computer B, transmitting the password "in the clear" exposes the system to the risk that an eavesdropper may intercept the password and use it to gain unauthorized access to computer A. In another configuration, a computer B may access a computer A without computer B having to provide a password. This may be done by providing computer B with the necessary public/private keys for encrypted communication with computer A, such as via SSH, and by configuring computer A to not require password access where computer B uses the proper public/private key protocol, allowing computer A to authenticate computer B's identity.

In the UNIX operating system, users who wish to gain access to a computer may be "trusted" users possessing the necessary public/private keys for non-password access to the computer, or "untrusted" users requiring password access. While access to the root directory is particularly sensitive, as this affords the opportunity to control the most critical aspects of the operating system, root access may nonetheless be gained by untrusted users using the basic password access protocol, with all of its risks. While password access to the root may be disabled by setting PermitRootLogin=no in the /etc/ssh/sshd_config file, doing so would render the root inaccessible even to trusted users having the necessary public/private keys. It would be therefore be advantageous to increase the level of security required for untrusted user access without affecting the level of security required for trusted user access.

SUMMARY OF THE INVENTION

The present invention discloses a system and method for improved computer security access whereby password access is disabled for an access record, while an alternate access record is created at the same access level with password access and a supplemental security program. In this manner key-based access is preserved while password-based access security is enhanced.

In one aspect of the present invention a method is provided for improved computer access security, the method including protecting an access record to prevent password access to a computer via the access record, creating an alternate access record corresponding to the protected record, enabling password access to the computer via the alternate record, providing the alternate record with the access level of the protected record, and configuring the alternate record to indicate a supplemental security program to be executed once a correct password for the alternate record is provided.

In another aspect of the present invention the method further includes executing a shell program indicated by the protected record subsequent to the supplemental security program allowing access to the computer.

In another aspect of the present invention the protecting step includes protecting the access record of the computer running the UNIX operating system.

In another aspect of the present invention the protecting step includes protecting a root directory access record.

In another aspect of the present invention the protecting step includes protecting by modifying the access record in a /etc/passwd file.

In another aspect of the present invention the protecting step includes replacing a password of the access record with an entry indicating that password access is not allowed for the access record.

In another aspect of the present invention the creating step includes creating the alternate record in the /etc/passwd file.

In another aspect of the present invention the providing step includes assigning the alternate record with a UID=

In another aspect of the present invention the configuring step includes configuring the supplemental security program to execute a one-time-password protocol.

In another aspect of the present invention the configuring step includes configuring the supplemental security program to execute a challenge/response protocol.

In another aspect of the present invention a system is provided for improved computer access security, the system including means for protecting an access record to prevent password access to a computer via the access record, means for creating an alternate access record corresponding to the protected record, means for enabling password access to the computer via the alternate record, means for providing the alternate record with the access level of the protected record, and means for configuring the alternate record to indicate a supplemental security program to be executed once a correct password for the alternate record is provided.

In another aspect of the present invention the supplemental security program is operative to execute a shell program indicated by the protected record subsequent to the supplemental security program allowing access to the computer.

In another aspect of the present invention the computer runs the UNIX operating system.

In another aspect of the present invention the access record is a root directory access record.

In another aspect of the present invention the means for protecting is operative to modify the access record in a /etc/passwd file.

In another aspect of the present invention the means for protecting is operative to replace a password of the access record with an entry indicating that password access is not allowed for the access record.

In another aspect of the present invention the means for creating is operative to create the alternate record in the /etc/passwd file.

In another aspect of the present invention the means for providing is operative to assign the alternate record with a UID=

In another aspect of the present invention the supplemental security program is operative to execute a one-time-password protocol.

In another aspect of the present invention the supplemental security program is operative to execute a challenge/response protocol.

In another aspect of the present invention a computer-implemented program is provided embodied on a computer-readable medium, the computer program including a first code segment operative to protect an access record to prevent password access to a computer via the access record, a second code segment operative to create an alternate access record corresponding to the protected record, a third code segment operative to enable password access to the computer via the alternate record, a fourth code segment operative to provide the alternate record with the access level of the protected record, and a fifth code segment operative to configure the alternate record to indicate a supplemental security program to be executed once a correct password for the alternate record is provided.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
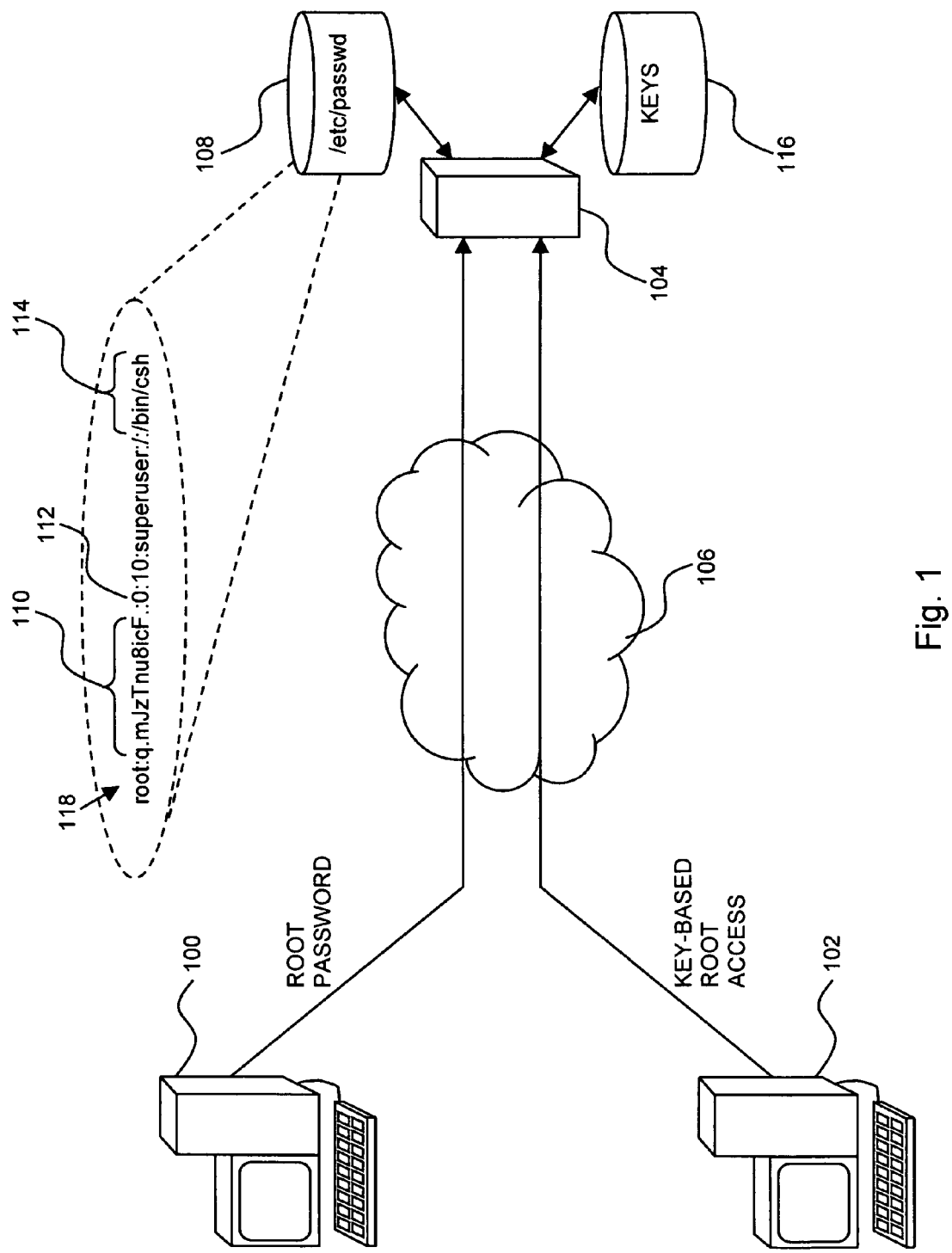
FIG. 1 is a simplified pictorial illustration of an exemplary system for computer access, useful in understanding the present invention.

Reference is now made to FIG. 1, which is a simplified pictorial illustration of an exemplary system for computer access, useful in understanding the present invention. In the system of FIG. 1, two computers 100 and 102 are shown accessing a computer 104, such as may be configured to run the UNIX operating system, via a network 106, such as the Internet. Computer 100 is shown transmitting to computer 104 a password for accessing the root of computer 104. Computer 104 checks the password using conventional techniques, such as by checking a corresponding record 118 in a /etc/passwd file 108. In the example shown, the root user record in /etc/passwd includes, among other things, an encrypted representation 110 of the valid password, a user ID (UID) 112 of 0, and the name of a shell program 114 that is to be executed if the password provided by computer 100 is found to be valid. Computer 102 is shown transmitting to computer 104 a key-based root access request, such as via the SSH protocol, for accessing the root of computer 104. In the example shown, computer 104 is configured to not require password access where a public/private key-based protocol is used. Computer 104 authenticates the requestor using a key database 116 in accordance with conventional techniques. Once the access request is approved, shell program 114 that is specified in the root user record in /etc/passwd 108 is preferably executed.

Figure 2:
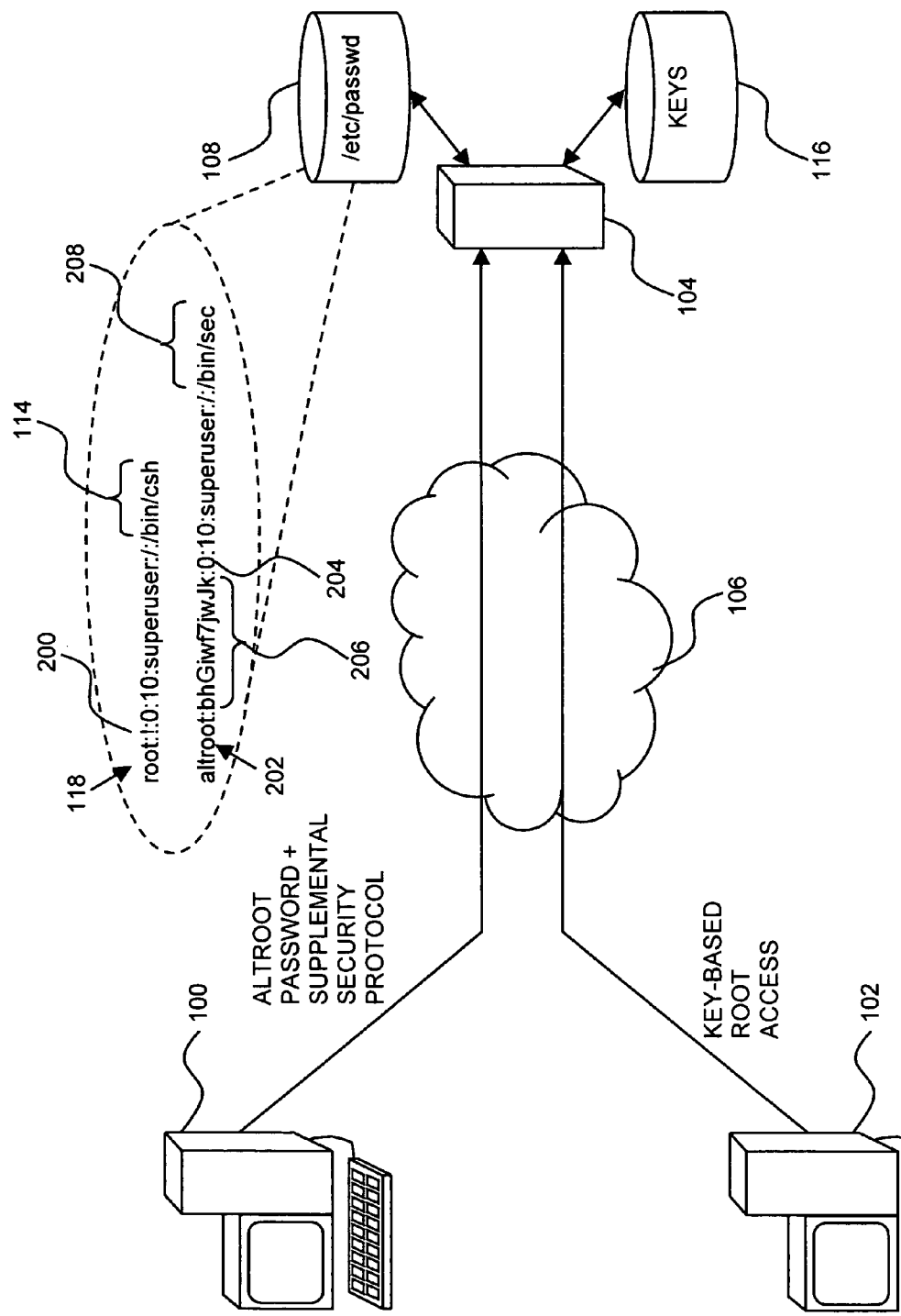
FIG. 2 is a simplified pictorial illustration of a system for computer access, constructed and operative in accordance with a preferred embodiment of the present invention.
Figure 3:
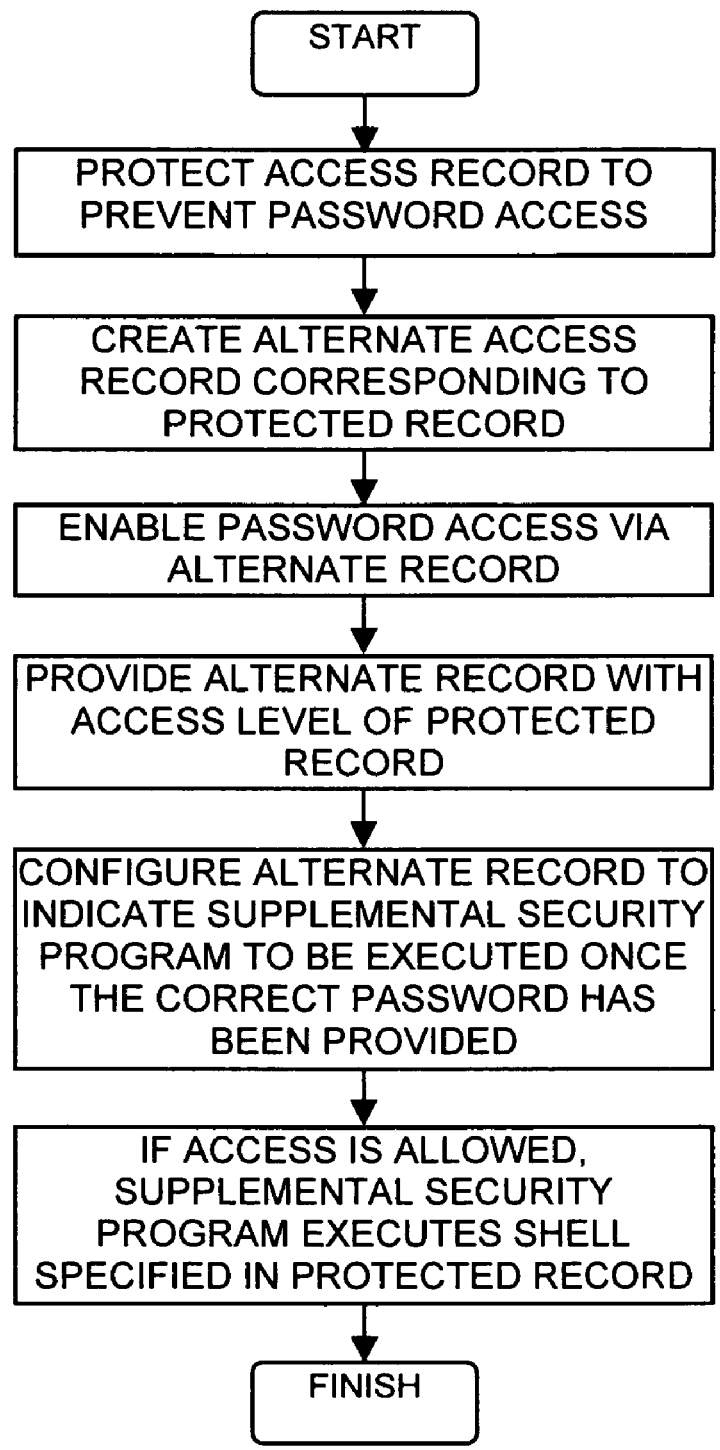
FIG. 3 is a simplified flowchart illustration of an exemplary method of operation of the system of FIG. 2, operative in accordance with a preferred embodiment of the present invention.

Reference is now made to FIG. 2, which is a simplified pictorial illustration of a system for computer access, constructed and operative in accordance with a preferred embodiment of the present invention, and to FIG. 3, which is a simplified flowchart illustration of a method of operation of the system of FIG. 2, operative in accordance with a preferred embodiment of the present invention. In the system and method of FIGS. 2 and 3, supplemental security is provided for an access level, such as root directory access, by modifying the corresponding record 118 in /etc/passwd 108 to prevent password access. This "protected record" 118 is preferably prepared by replacing the encrypted password with an entry reserved for this purpose, such as an exclamation mark as shown at 200. An alternate record 202 corresponding to protected record 118 is created in /etc/passwd 108, such as the record labeled 'altroot'. Alternate record 202 is provided with the same access level as that of protected record 118, such as by assigning alternate record 202 a UID=0 for UNIX root access as shown at 204. Alternate record 202 also preferably requires its own password 206. Instead of indicating a shell program to be executed, alternate record 202 indicates a supplemental security program 208 to be executed once the correct password has been provided. Supplemental security program 208 preferably implements a security protocol that is stronger than the basic reusable password protocol, such as a one-time-password protocol or a challenge/response protocol such as CHAP.

Thus, to gain entry to a desired access level, computer 100 must request access via alternate record 202, as password access to protected record 118 is prevented, and provide the correct password. Supplemental security program 208 is then executed, requiring additional validation and/or authentication of computer 100. Once supplemental security program 208 approves the access request, supplemental security program 208 preferably executes shell program 114 that is specified in protected record 118 in /etc/passwd 108.

It will be seen that computer 102 may access computer 104 with a key-based root access request, and that such access is not affected by the modification to password-based access as described above.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for improved computer access security, the method comprising:

modifying an access record, having a password embedded therein, by removing said password from said access record, thereby preventing said access record from which said password was removed from being used to allow access to a computer, wherein said access record is stored within a file, and wherein said modifying is performed upon said access record within said file;

creating within said file an alternate record corresponding to said access record, wherein said alternate record is separate from said access record;

enabling password access to said computer via said alternate record;

embedding within said alternate record an indicator indicating an access level embedded within said access record; and embedding within said alternate record the name of a supplemental security program to be executed once a correct password for said alternate record is provided.

2. A method according to claim 1 and further comprising executing a shell program indicated by said modified record subsequent to said supplemental security program allowing access to said computer.

3. A method according to claim 1 wherein said modifying step comprises modifying said access record of said computer running the UNIX operating system.

4. A method according to claim 3 wherein said modifying step comprises modifying a root directory access record.

5. A method according to claim 3 wherein said modifying step comprises modifying said access record in a /etc/passwd file.

6. A method according to claim 5 wherein said modifying step comprises replacing said password of said access record with an entry indicating that password access is not allowed for said access record.

7. A method according to claim 5 wherein said creating step comprises creating said alternate record in said /etc/passwd file.

8. A method according to claim 4 wherein said step of embedding within said alternate record said indicator indicating said access level comprises assigning said alternate record with a UID=0.

9. A method according to claim 1 wherein said step of embedding within said alternate record said name of said supplemental security program comprises configuring said supplemental security program to execute a one-time-password protocol.

10. A method according to claim 1 wherein said step of embedding within said alternate record said name of said supplemental security program comprises configuring said supplemental security program to execute a challenge/response protocol.

11. A method for improved computer access security, the method comprising:
    determining that a first access record stored in a file includes an indicator indicating that the use of said first access record is to be prevented when determining whether a password received in connection with a request to access a computer is valid;
    determining whether said password is valid using a second access record corresponding to said first access record, said second access record being stored in said file, said second access record being separate from said first access record, said second access record including an indicator embedded within said second access record and indicating a supplemental security program to be executed when said password is determined to be valid;
    executing, if said password is valid, said supplemental security program indicated by said second access record; and
    granting said request to access said computer if said supplemental security program approves said access request.

* * * * *